(12) United States Patent
Drzymala et al.

(10) Patent No.: US 8,146,822 B2
(45) Date of Patent: Apr. 3, 2012

(54) EXPOSURE CONTROL FOR MULTI-IMAGING SCANNER

(75) Inventors: Mark Drzymala, Commack, NY (US); Edward D. Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 360 days.

(21) Appl. No.: 12/416,997

(22) Filed: Apr. 2, 2009

(65) Prior Publication Data
US 2010/0252635 A1 Oct. 7, 2010

(51) Int. Cl.
*G06K 7/10* (2006.01)
*G06K 15/12* (2006.01)
*G06K 7/14* (2006.01)

(52) U.S. Cl. ............................... 235/462.41; 235/454

(58) Field of Classification Search ............ 235/462.42, 235/454, 462.06, 472.01, 462.1, 464; 369/44.24
See application file for complete search history.

(56) References Cited

U.S. PATENT DOCUMENTS

| | | | | |
|---|---|---|---|---|
| 5,572,006 | A * | 11/1996 | Wang et al. | 235/454 |
| 5,756,981 | A * | 5/1998 | Roustaei et al. | 235/462.42 |
| 6,230,975 | B1 * | 5/2001 | Colley et al. | 235/462.06 |
| 2006/0022051 | A1 | 2/2006 | Patel et al. | |
| 2006/0077795 | A1 * | 4/2006 | Kitahara et al. | 369/44.24 |
| 2006/0118632 | A1 | 6/2006 | Joseph et al. | |
| 2006/0219790 | A1 * | 10/2006 | Quinn et al. | 235/454 |
| 2007/0034696 | A1 * | 2/2007 | Barkan et al. | 235/472.01 |
| 2007/0228174 | A1 | 10/2007 | Vinogradov et al. | |
| 2009/0084854 | A1 | 4/2009 | Carlson | |

FOREIGN PATENT DOCUMENTS

| | | |
|---|---|---|
| EP | 1933254 | 6/2008 |
| WO | 9603708 | 2/1996 |

OTHER PUBLICATIONS

International Search Report and Written Opinion dated Aug. 20, 2010 in related case PCT/US2010/019004.
International Search Report and Written Opinion dated Oct. 21, 2009 in related case PCT/US2009/048435.

* cited by examiner

*Primary Examiner* — Thien T Mai
(74) *Attorney, Agent, or Firm* — Nongqiang Fan (57) ABSTRACT

A multi-imaging scanner (12) and method for imaging indicia (14) located on target objects (16) is featured in the present disclosure. The multi-imaging scanner (12) includes one or more cameras (30) for imaging indicia (14) on target objects (16) and a sensor array (48) associated with each of the one or more cameras (30) for capturing a series of frames (FR1-FR6) within a respective field of view of each of the one or more cameras (30). The multi-imaging scanner (12) further includes a processor (44) coupled the one or more cameras (30) for imaging and decoding the indicia (14) on the target objects (16) captured in the frames by the one or more cameras. The frames (FR1-FR6) include a first frame having a first pre-set exposure time and a second frame having a second pre-set exposure time such that first and second pre-set exposure times are of different duration.

19 Claims, 10 Drawing Sheets

EXPOSURE CONTROL FOR MULTI-IMAGING SCANNER

TECHNICAL FIELD

The present disclosure relates to an exposure control system for a multi-imaging scanner, and more specifically a selectable and predefined exposure control system for reading multiple images.

BACKGROUND

Various electro-optical systems have been developed and used for reading optical indicia, such as barcodes. A barcode is a coded pattern of graphical indicia comprised of a series of bars and spaces of varying widths, the bars and spaces having differing light reflecting characteristics. The pattern of the bars and spaces encode information. Barcode may be one-dimensional (e.g., UPC barcode) or two-dimensional (e.g., DataMatrix barcode). Systems that read, that is, image and decode barcodes employing imaging camera systems are typically referred to as imaging-based barcode readers.

Imaging-based barcode readers may be portable or stationary. A portable barcode reader is one that is adapted to be held in a user's hand and moved with respect to target indicia, such as a target barcode, to be read, that is, imaged and decoded. Stationary barcode readers are typically mounted in a fixed position, for example, relative to a point-of-sales counter often referred to as a bi-optic scanner (based on multiple windows and/or cameras), a slot scanner, or a single window stationary scanner.

Target objects, e.g., a product package that includes a target barcode, are moved or swiped past one of the one or more transparent windows and thereby pass within a field-of-view ("FOV") of the stationary barcode readers. The barcode reader typically provides an audible and/or visual signal to indicate the target barcode has been successfully imaged and decoded. Sometimes barcodes are "presented", as opposed to "swiped". This typically happens when the swiped barcode failed to scan, so the operator tries a second time to scan it.

A typical example where a stationary imaging-based barcode reader would be utilized includes a point of sale counter/cash register where customers pay for their purchases. The stationary imaging-based barcode reader is typically enclosed in a housing that is installed in the counter and normally includes a vertically oriented transparent window and/or a horizontally oriented transparent window, either of which may be used for reading the target barcode affixed to the target object, i.e., the product or product packaging for the product having the target barcode imprinted or affixed to it. The sales person (or customer in the case of self-service check out) sequentially presents each target object's barcode either to the vertically oriented window or the horizontally oriented window, whichever is more convenient given the specific size and shape of the target object and the position of the barcode on the target object.

Both the stationary and portable imaging-based barcode readers can be equipped with a plurality of imaging cameras that will be referred to herein as a multi-camera, imaging-based scanner, barcode reader, or multi-imager scanner. In a multi-imager scanner, each camera system typically is positioned behind one of the plurality of transparent windows such that it has a different field-of-view from every other camera system. While the fields-of-view may overlap to some degree, the effective or total field-of-view ("TFV") of the multi-imaging scanner is increased by adding additional camera systems. Hence, there is a greater desirability of multi-camera readers as compared to signal camera readers, which have a smaller effective field-of-view and require presentation of a target barcode to the reader in a very limited orientation to obtain a successful, decodable image, that is, an image of the target barcode that is decodable.

The camera systems of a multi-imaging scanner may be positioned within the housing and with respect to the transparent windows such that when a target object is presented to the housing for reading the target barcode on the target object, the target object is imaged by the plurality of imaging camera systems, each camera providing a different image of the target object. One example of such a system is found in U.S. patent application Ser. No. 11/862,568 filed Sep. 27, 2007 entitled MULTIPLE CAMERA IMAGING BASED BAR CODE READER that is assigned to the assignee of the present invention and is incorporated herein by reference.

SUMMARY

One example embodiment of the present disclosure comprises a multi-imaging scanner for imaging indicia located on target objects having a housing supporting one or more transparent windows and defining an interior region comprising one or more cameras for imaging indicia on target objects as the target objects approach a desired range of the multi-imaging scanner. The multi-imaging scanner further comprises a sensor array associated with each of the one or more cameras for capturing a series of frames within a respective field of view of each of the one or more cameras and a processor coupled to the one or more cameras for imaging and decoding the indicia on the target objects captured in the frames. The frames comprise a first frame having a first pre-set exposure time and a second frame having a second pre-set exposure time such that first and second pre-set exposure times are of different duration.

Another example embodiment of the present disclosure includes a method of operating a multi-imaging scanner for imaging indicia located on target objects comprising supporting one or more transparent windows in a housing that defines an interior region and imaging indicia located on target objects with one or more cameras as the target objects approach a desired range of the multi-imaging scanner. The method further comprises capturing a series of frames within a respective field of view of each of the one or more cameras with a sensor array associated with each of the one or more cameras and coupling a processor to the one or more cameras for imaging and decoding the indicia on the target objects captured in the frames by the one or more cameras. The method also includes allocating a first frame in the frames with a first pre-set exposure time and a second frame with a second pre-set exposure time such that first and second pre-set exposure times are of different duration.

Yet another example embodiment of the present disclosure includes a multi-imaging system for imaging indicia located on target objects comprising a scanner having a housing supporting one or more transparent windows and defining an interior region having one or more cameras for imaging indicia on target objects as the target objects approach a desired range of the multi-imaging scanner. The system further comprises a sensor array associated with each of the one or more cameras for capturing a series of frames within a respective field of view of each of the one or more cameras and a processor coupled to the one or more cameras for imaging and decoding the indicia on the target objects captured in the frames by the one or more cameras. The system also includes a pick list programmed into the multi-imaging system having a plurality of pre-set exposure times to be selectively elected by the processor for the frames for the one or more cameras each having a first frame with a first pre-set exposure time and one or more subsequent frames having a subsequent pre-set exposure time wherein the subsequent exposure time is selected from the plurality of pre-set exposure times.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to an exposure control system for a multi-imaging scanner, and more specifically a selectable and predefined exposure control system for reading multiple images. In particular, the present disclosure teaches a system, apparatus, and method for increasing scanning productivity in view of variations in light and images reflected off target images, barcodes, and indicia due to differences in distances from the scanner or dissimilarities in the composition of the window or windows installed on scanners. The increase in scanning productivity (i.e., successful reading and decoding of target barcodes) despite signal variations based on target object distance, swipe speed (which produces image blur), and/or window composition (that may reduce barcode signal) is achieved by alternating between pre-set exposure times and/or pre-set intensity levels from frame-to-frame for one or more of the cameras in the multi-imaging scanner of the disclosed imaging system.

The pre-set times are established as a result of evaluating system parameters, such as variations in transmission rates of windows in the scanner or location of the target image or barcode to be scanned.

Figure 1:
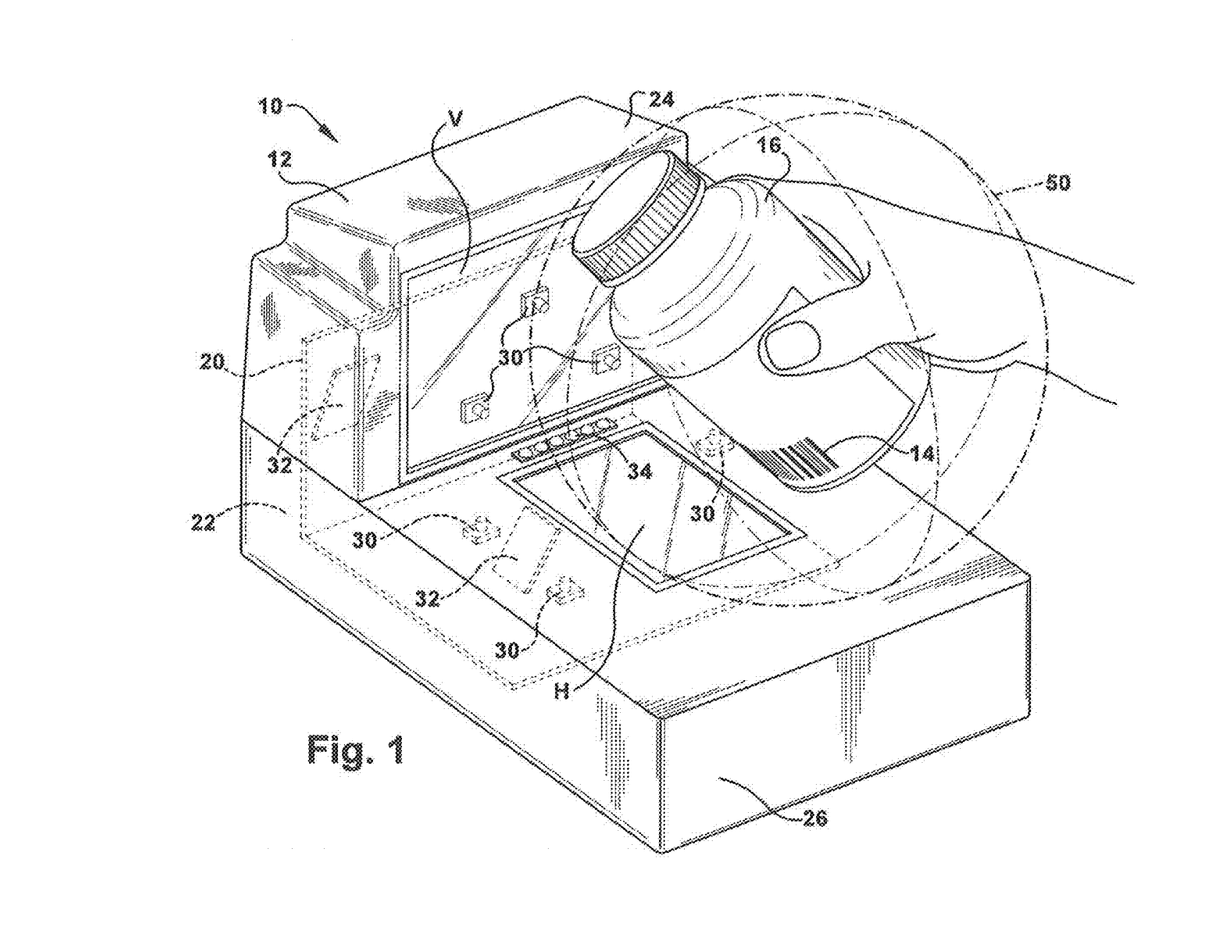
FIG. 1, is a perspective view of a presentation-type multi-imaging scanner constructed in accordance with one embodiment of the present disclosure for reading multiple images having a vertical and a horizontal window through which target objects are view by multiple cameras within the multi-imaging scanner that collectively form a scan field.

With reference now to the figures, and in particular with reference to FIG. 1, there is depicted an exemplary embodiment of an imaging system 10, comprising a multi-imaging scanner 12 for reading, that is, imaging and decoding target indicia 14. The target indicia 14 includes (1D) and (2D) barcodes, signatures, fingerprints, postal codes, hard and soft images, and the like, hereinafter referred to as "target barcode (s) 14" located on, for example, target objects 16 such as products, packages, and product containers.

In the illustrated embodiment of FIG. 1, the multi-imaging scanner 12 is a presentation scanner or bi-optic scanner that is typically integrated into a sales counter that of a point-of-sales system that includes, for example, a cash register, a touch screen visual display or other type user interface and a printer for generating sales receipts. The multi-imaging scanner 12 includes a housing 18 depicted in FIG. 1 that supports two transparent windows, a horizontal window ("H") and vertical window ("V"). In an alternative embodiment (not shown), the multi-imaging scanner 12 is a presentation scanner having a single window either horizontally or vertically located in the housing 18. In yet another embodiment (not shown), the multi-imaging scanner 12 is a presentation scanner having more than two windows supported in the housing 18.

In the illustrated exemplary embodiment, the multi-imaging scanner 12 is stationary and image and decoder systems 20 are supported within an interior region 22 of the housing 18. The housing 18 further comprises an upper portion 24 for supporting the vertical window V and a base portion 26, supporting the horizontal window H.

A plurality of imaging cameras 30 are located within the housing 18 of the multi-imaging scanner 12 that are coupled to the imager and decoder system 20. The plurality of imaging cameras 30 have a respective field-of-view (FOV), extending from the window of multi-imaging scanner 12 either directly or with the aid of one or more mirrors 32 positioned within the housing 18. Further functions of the mirrors shown are described in further detail in U.S. patent application Ser. No. 12/245,111 filed Oct. 3, 2008 entitled BAR CODE READERS HAVING MULTIFOLD MIRRORS, which is assigned to the assignee of the present disclosure and is incorporated herein by reference in its entirety. The respective FOV and optical axis from each imaging camera 30 in the illustrated embodiment is different and each FOV collectively form an effective or total field-of-view (TFV) of the multi-imaging scanner 12. The TFV may include overlapping FOVs between the cameras 30, despite each camera having a different optical axis for the respective FOV.

In the illustrated embodiment of FIG. 1, the cameras 30 and mirrors 32 are located in both the upper portion 24 and base portion 26 of the housing 18, but could be located in only the upper or base portions without departing from the spirit and scope of the claimed disclosure. The positioning of the cameras 30 and mirrors 32 are such to allow each respective FOV to see different sides of the target object 16 and scan the target barcode 14 as it passes over one or both of the windows, V and H, respectively. Further discussion of the positioning of the mirrors and cameras in a multi-imaging scanner can be found in U.S. application Ser. No. 12/168,347 entitled MULTI-IMAGING SCANNER FOR READING MULTIPLE IMAGES filed Jul. 7, 2008, which is assigned to the assignee of the present disclosure and is incorporated herein by reference in its entirety.

The imaging and decoding of the target barcode 14 is aided in the illustrated embodiment by an illumination system 34 located in the housing 18 of the scanner 12. The illumination system 34 can be a single light emitting diode (LED), bank of LEDs, a single or combination of cold cathode lamp (CFL), and the like that facilitate the reflection of the target barcode 14 into the FOVs of the cameras 30 during the imaging and decoding process. In an alternative embodiment (not shown), the illumination system 34 is remotely located outside of the scanner 12 housing 18.

In yet another embodiment (not shown), the imaging system 10 is a portable-type multi-imaging scanner. The portable-type multi-imaging scanner is constructed such to allow it to be carried and used by a user walking or riding through a store, warehouse, or plant, while reading various symbology codes for stocking and inventory control purposes. However, it should be recognized that the imaging system 10 of the present disclosure, to be explained below, may be advantageously used in connection with any type of imaging-based automatic identification system including, but not limited to, bar code scanners, signature imaging acquisition and identification systems, optical character recognition systems, fingerprint identification systems, and the like. It is the intent of the present disclosure to encompass all such imaging-based automatic identification systems.

Figure 2:
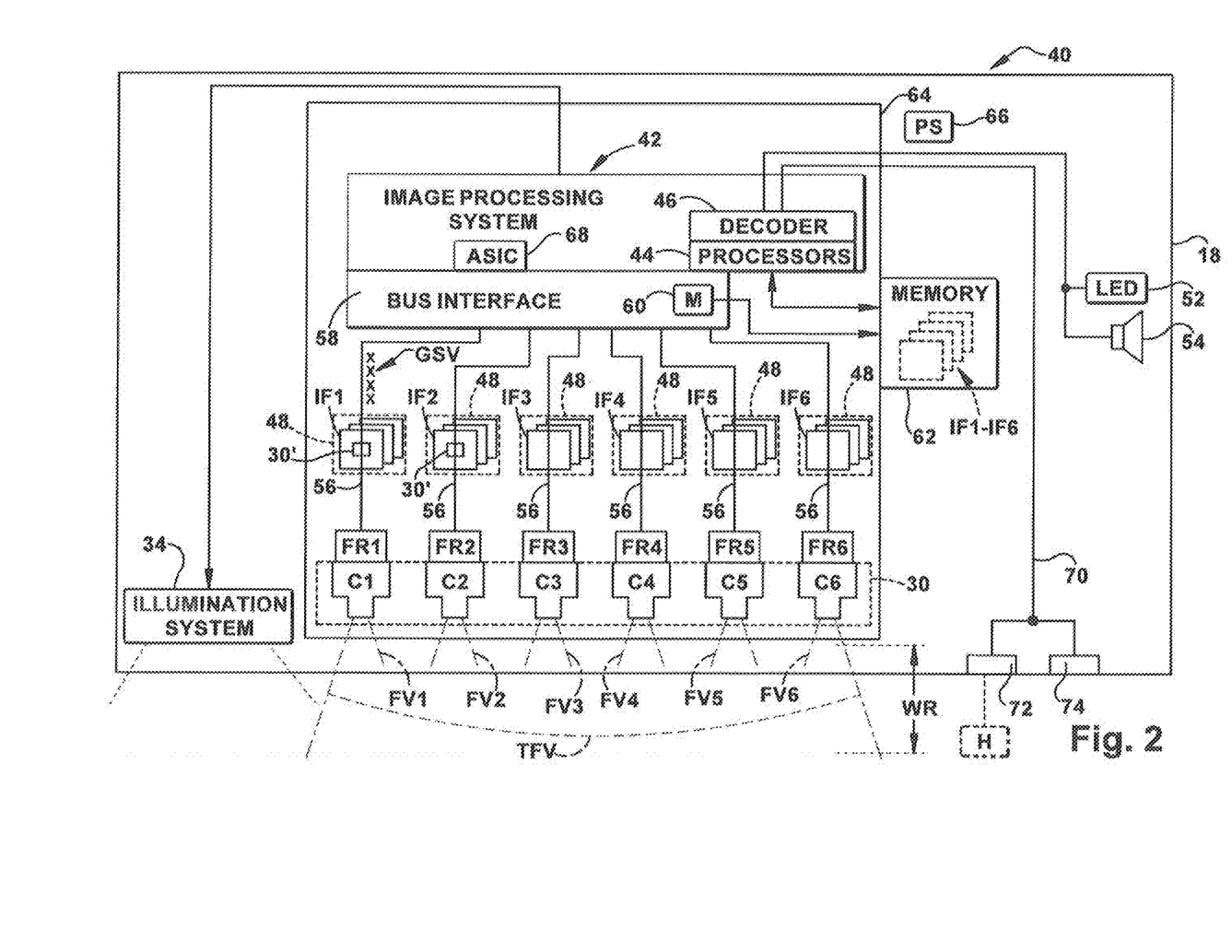
FIG. 2 a schematic block diagram of selected systems and electrical circuitry of a multi-imaging scanner constructed in accordance with one embodiment of the present disclosure.

FIG. 2 is a schematic block diagram of selected systems and electrical circuitry 40 of the multi-imaging scanner 12 that schematically represents the plurality of cameras 30 of FIG. 1 as imaging cameras C1, C2, C3, C4, C5, C6, which produce raw gray scale images, and an image processing system 42. The image processing system 42 includes one or more processors 44 and a decoder 46 that analyzes the gray scale images from the cameras and decodes imaged target barcodes 14, if present. The above processors 44 and decoder 46 may be integrated into the multi-imaging scanner 12 or may be a separate system, as would be understood by one of skill in the art.

In the exemplary embodiment, the plurality of cameras 30 represented by C1-C6 are coupled to an imager/decoder system 20 (See FIG. 1) such as one or more printed circuit boards inside the housing 18 and each camera C defines a two dimensional field-of-view FV1, FV2, FV3, FV4, FV5, FV6. Positioned behind and adjacent to the windows H, V are the reflective mirrors 32 (See FIG. 1) that help define a given camera field-of-view such that the respective fields-of-view FV1-FV6 pass from the housing 18 through the windows creating an effective total field-of-view ("TFV"). The TFV forms a scan field 50 (See FIG. 1) for the multi-imaging scanner 12 in a region of the windows H, V, outside the housing 18.

Because each camera C1-C6 of the plurality of cameras 30 has an effective working range WR (shown schematically in FIG. 2) over which a target barcode 14 may be successfully imaged and decoded, there is an effective target area (the scan field 50) in front of the windows H,V. Within the scan field 50, the target barcode 14 presented for reading may be successfully imaged and decoded.

The imaging cameras C1-C6 are arranged such that their field-of-views FV1-FV6 makes it impossible for a target barcode 14 to move through the scan field 50 without being seen by at least one imaging camera. In the exemplary multi-imaging scanner 12, three of the cameras C4-C6, look out of a vertical window V and three cameras C1-C3 look out of a horizontal window H and their field-of-views collectively form the scan field 50. In use, a user slides a package or container 16 having a target barcode 14 through the scan field 50 in front of the windows. The target object 14 may be visible to cameras behind the vertical window, or to cameras behind the horizontal window, or both. The target barcode 14 may move through the center of the scan field 50 of the cameras, or through one end or the other of the scan field.

Each camera assembly C1-C6 of the plurality of cameras 30 associated with the imaging system 10, captures a series of image frames of its respective field of view FV1-FV6 (See FIG. 2). The series of image frames for each camera assembly C1-C6 is shown schematically as IF1, IF2, IF3, IF4, IF5, IF6 in FIG. 2. Each series of image frames IF1-IF6 comprises a sequence of individual image frames generated by a respective sensor array 48 associated with each of the respective cameras C1-C6 of the plurality of cameras 30. As seen in the drawings, the designation IF1, for example, represents multiple successive images obtained from the camera C1. As is conventional with imaging cameras, the image frames IF1-IF6 are in the form of respective digital signals representative of raw gray scale values generated by each of the camera assembly C1-C6.

The exemplary illumination system 34 has one or more high energy light emitting diodes that are associated with each of the cameras C1-C6. In an alternative embodiment (not shown), the illumination system 34 is made up of cold cathode fluorescent lamps (CCFLs) or a combination of LEDs and CCFLs.

In accordance with one use, either a sales person or a customer will present a product or container 16 selected for purchase to the housing 18. More particularly, a target barcode 14 imprinted or affixed to the product or product's container 16 will be presented in a region near the windows H, V into the scan field 50 for reading, that is, imaging and decoding of the coded indicia of the target object. Upon a successful reading of the target barcode 14, a visual and/or audible signal will be generated by the multi-imaging scanner 12 to indicate to the user that the target barcode 14 has been successfully imaged and decoded. The successful read indication may be in the form of illumination of a light emitting diode (LED) 52 (FIG. 2) and/or generation of an audible sound by a speaker 54 upon generation of an appropriate signal from the decoder 46.

The image processor or processors 44 controls operation of the cameras C1-C6. The cameras C1-C6, when operated during an imaging system, generate digital signals 56. The signals 56 are raw, digitized gray scale values that correspond to a series of generated image frames for each camera. For example, for the camera C1, the signal 56 corresponds to digitized gray scale values corresponding to a series of image frames IF1. For the camera C2, the signal 56 corresponds to digitized gray scale values corresponding to a series of image frame IF2, and so on. The digital signals 56 are coupled to a bus interface 58, where the signals are multiplexed by a multiplexer 60 and then communicated to a memory 62 in an organized fashion so that the processor knows which image representation belong to a given camera.

The image processors 44 access the image frames IF1-IF6 from memory 62 and search for image frames that include an imaged target barcode 14'. If the imaged target barcode 14' is present and decodable in one or more image frames, the decoder 46 attempts to decode the imaged target barcode 14' using one or more of the image frames having the imaged target barcode 14' or a portion thereof.

Each camera of the plurality of cameras 30 includes a charged coupled device ("CCD"), a complementary metal oxide semiconductor ("CMOS"), or other imaging pixel array, operating under the control of the imaging processing system 42. In one exemplary embodiment, the sensor array comprises a two-dimensional ("2D") CMOS array with a typical size of the pixel array being on the order of 752×480 pixels.

The multi-imaging scanner 12 circuitry 40 includes an imaging arrangement 64, the memory 62, and a power supply 66. The power supply 66 is electrically coupled to and provides power to the circuitry 40 of the multi-imaging scanner 12. Optionally, the multi-imaging scanner 12 may include an illumination system 34 (shown schematically in FIG. 2) that provides illumination to illuminate the effective total field-of-view and scan field 50 to facilitate obtaining an image 14' of a target barcode 14 that has sufficient resolution and clarity for decoding.

For each camera assembly C1-C6, electrical signals are generated by reading out of some or all of the pixels of the pixel array after an exposure period generating the gray scale value digital signal 56. This occurs as follows: within each camera, the light receiving photosensor/pixels of the sensor array are charged during an exposure period. Upon reading out of the pixels of the sensor array, an analog voltage signal is generated whose magnitude corresponds to the charge of each pixel read out. The image signals 56 of each camera assembly C1-C6 represents a sequence of photosensor voltage values, the magnitude of each value representing an intensity of the reflected light received by a photosensor/pixel during an exposure period.

Processing circuitry of the camera assembly, including gain and digitizing-circuitry, then digitizes and coverts the analog signal into a digital signal whose magnitude corresponds to raw gray scale values of the pixels. The series of gray scale values GSV represent successive image frames generated by the camera assembly. The digitized signal 56 comprises a sequence of digital gray scale values typically ranging from 0-255 (for an eight bit A/D converter, i.e., $2^8$=256), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array are not exposed at the same time, thus, reading out of some pixels may coincide in time with an exposure period for some other pixels.

As is best seen in FIG. 2, the digital signals 56 are received by the bus interface 58 of the image processing arrangement 64, which may include the multiplexer 60, operating under the control of an ASIC 68, to serialize the image data contained in the digital signals 56. The digitized gray scale values of the digitized signal 56 are stored in the memory 62. The digital values GSV constitute a digitized gray scale version of the series of image frames IF1-IF6, which for each camera assembly C1-C6 and for each image frame is representative of the image projected by the imaging lens assembly onto the pixel array during an exposure period. If the field-of-view of the imaging lens assembly includes the target barcode 14, then a digital gray scale value image 14' of the target barcode 14 would be present in the digitized image frame.

The decoding circuitry 42 then operates on selected image frames and attempts to decode any decodable image within the image frames, e.g., the imaged target barcode 14'. If the decoding is successful, decoded data 70, representative of the data/information coded in the target barcode 14 may then be processed or output via a data port 72 to an external computer; which also may communicate data to the reader used in reprogramming the camera used to detect objects. A successful decode can also be displayed to a user of the multi-imaging scanner 12 via a display output 74. Upon achieving a good read of the target barcode 14 was successfully imaged and decoded, the speaker 54 and/or an indicator LED 52 may then be activated by the multi-imaging scanner circuitry 40 to indicate to the user that the target barcode 14 has successfully read.

In conventional multi-imager scanners, light reflected off the barcodes and received by the imagers can vary due to variations in distance from the scanner or variations in composition in the window glass that is selected for installation on the scanner. For example, the scanner windows might consist of tempered glass that transmits approximately 90% of light, or of glass with a scratch resistant diamond-like coating (DLC), which transmits light at 70% efficiency, or the windows can consist of a thin sheet of sapphire that is laminated to a glass substrate. Sapphire windows transmit approximately 84% of light at the wavelength of the LED illumination system used in imaging scanners (typically around 630 nm). Scanners with horizontal windows, such as Bi-Optic or horizontal mini slot scanners can be purchased with any kind of window, depending on the end users needs, and accordingly a scanner design of the present disclosure is constructed as described in more detail below to accommodate the various window transmission efficiencies.

Figure 3:
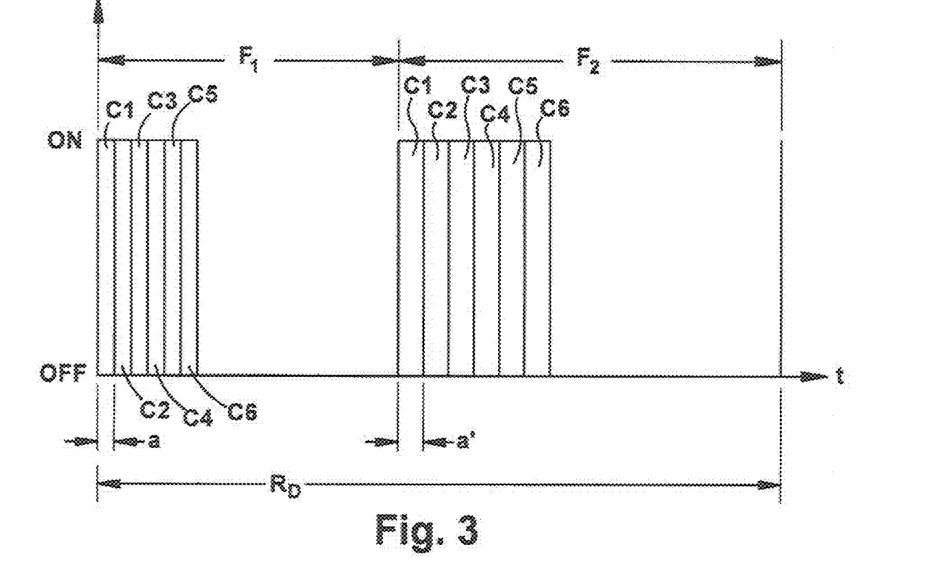
FIG. 3 is a graphical representation of one example embodiment comprising two frame exposure times over a desired range $R_D$ of one camera for one cycle in the multi-imaging scanner.

In the illustrated embodiment of FIGS. 1 and 2, one approach to increasing scanning productivity (i.e., successful reading and decoding of target barcodes) despite signal variations based on target object 16 distance, swipe speed (which produces image blur), and/or window composition (that may reduce barcode signal) is to alternate between pre-set exposure times and/or pre-set intensity levels from frame-to-frame for one or more of the cameras 30 in the multi-imaging scanner 12. For example, FIG. 3 depicts a graphical representation of one example embodiment comprising two frame exposure times "t" that cover a desired range "$R_D$" for each of the six cameras 30 (C1-C6) for one cycle in the multi-imaging scanner 12. The desired range $R_D$ covers the working area illustrated by the scan field 50 in FIG. 1 or the working area based on variations in window transmission, resulting from different glass compositions between scanners 12.

The desired range $R_D$ in the illustrated example embodiment of FIG. 3 comprises a first and second frame, designated by $F_1$ and $F_2$, respectively and is repeated during the imaging and decoding of the scanner 12 until a successful decoding of the target barcode 14 is achieved. Both the first and second frames, $F_1$, $F_2$, respectively comprise a pre-set exposure time for each of the cameras 30 (C1-C6) represented by area "a". The remainder of time in the first frame $F_1$ not consumed by the pre-set exposure time "a" (allocated for each of the cameras) is filled by the imaging and decoding process of the images obtained by the cameras. If the exposure time "a" for each of the cameras 30 (C1-C6) of the first frame $F_1$ is not sufficient in duration, it might not yield a decodable target barcode 14. In such a situation, the decoding process continues to the second frame $F_2$ that includes a new pre-set exposure time of a different duration than the first frame for each of the cameras 30 (C1-C6), represented by the area "a'". In the illustrated embodiment, the new pre-set time is of longer duration for each camera 30 in the second frame $F_2$ than the duration of the pre-set time in the first frame $F_1$. In one embodiment, the pre-set exposure time is adjusted by increasing the exposure duration, creating an adjustable pre-set time represented by the area "a'" in the second frame. The amount of adjustment in the pre-set exposure time can be obtained from a pre-defined pick list programmed into the imaging systems' 10 software or firmware located in the processor 44 or in a remote processor (not shown) as would be understood by one skilled in the art. In the illustrated embodiment, the second frame $F_2$ provides a successful read of the target barcode 14.

The combination of frames $F_1$ and $F_2$ should illustrate the imaging systems' 10 capability to alternate between two (or possibly more) pre-set and selectively pre-set exposure levels that cover the desired range $R_D$ or variations in the window's light transmission rates in the scanner 12. In the illustrated example embodiment of FIG. 3, the exposure times of each of the cameras 30 (C1-C6) is in an approximate range of ¼ ms (250 micro seconds) to ½ ms (500 micro seconds) in the first frame, $F_1$ and increased in frame two, $F_2$ to a pre-set amount, for example a few micro seconds to several hundred micro seconds and each frame operates, for example around 16 ms. In yet another example embodiment, the pre-set exposure duration "a" in the first frame $F_1$ differs for each camera 30 (C1-C6) and are increased or decreased to a second pre-set "a'" that differs for each camera in the second frame $F_2$.

Switching between the pre-set exposures illustrated in FIG. 3, advantageously eliminates the possible need for auto-exposure control in the imaging scanner 12. In addition, the switching between the pre-set exposures illustrated in FIG. 3 provides a superior imaging system 10 when compared to a single exposure scanning system, in that, the imaging system 10 may allow for more depth of field of the cameras 30 with virtually no additional cost to the imaging system 10.

In another example embodiment illustrated in FIG. 3, the areas "a" and "a'" for each of the cameras 30 represent, not the pre-set exposure duration, but instead represent the pre-set intensity value of the exposure upon the pixel array in the sensors 48. In this exemplary embodiment, an increase in the pre-set intensity that results from a change in the illumination source 34 in combination with a fixed exposure duration increases the depth field for the target object to obtain a successful read by the imaging scanner 12. In yet another example embodiment illustrated in FIG. 3, the areas "a" and "a'" for each of the cameras 30 represent a combination of both a pre-set exposure durations and pre-set intensity values of the exposure upon the pixel array in the sensor 48. By the illustrated example embodiment having pre-set exposure duration, intensity, or a combination thereof, allows for the advantageous reduction of hardware in conventional scanners such as automatic gain control circuits "AGC".

Figure 4:
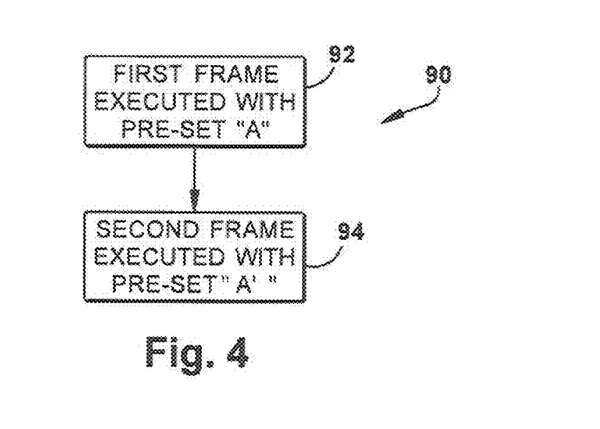
FIG. 4 is a flowchart of an exemplary embodiment of the disclosure illustrating a process of alternating between pre-set exposure times from frame-to-frame over a desired range $R_D$ of six cameras for one cycle in the multi-imaging scanner.

FIG. 4 is a flowchart of an exemplary embodiment of the disclosure relating to FIG. 3, illustrating a process 90 of alternating between pre-set exposure times from frame-to-frame over a desired range $R_D$ of six cameras for one cycle in the multi-imaging scanner 12, all of which are operating the process 90 independently. At 92, the first frame of the imaging scanner 12 is executed with a pre-set exposure duration "a". At 94, the second frame of the imaging scanner 12 is executed with a pre-set exposure duration of "a'", wherein the exposure duration in both frames can be different values between each respective camera 30 (C1-C6) and can be longer or shorter in duration in the second frame.

Yet another embodiment relating to FIG. 4 includes additional "n" frames with an equal number of "n" pre-set exposure times or pre-set intensities that cycle between frames for each camera until a successful read of the target barcode 14 is obtained, the scanner "times out", or the scanner reverts into a low-power mode.

Figure 5:
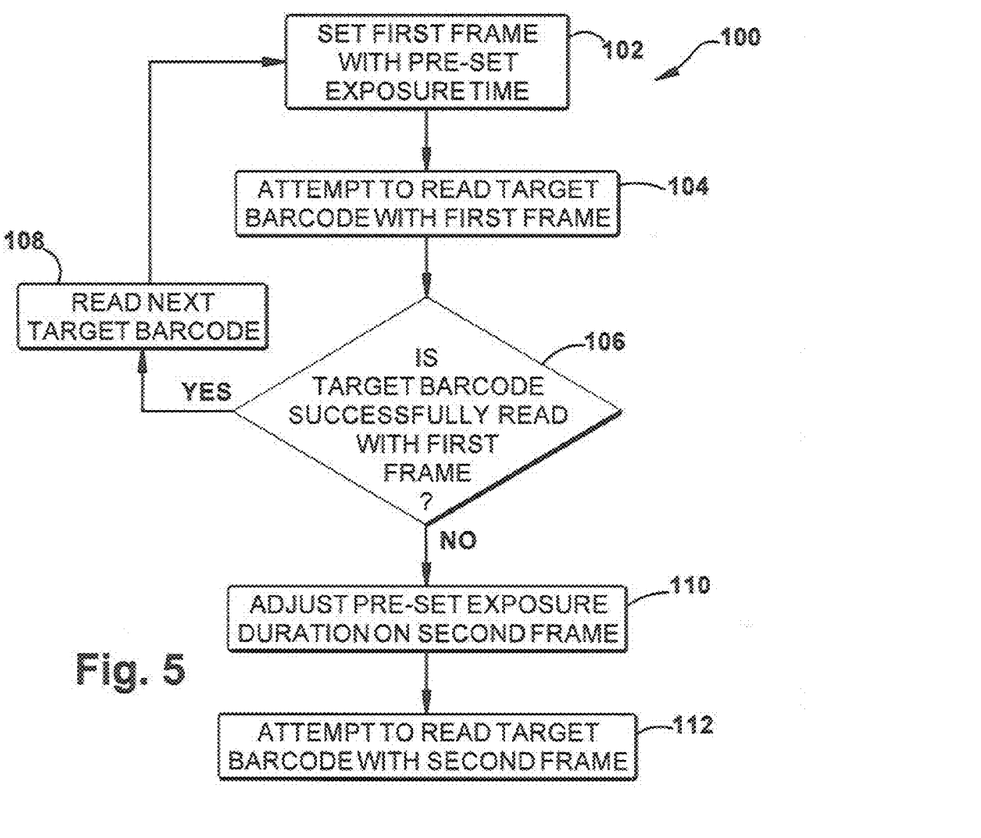
FIG. 5 is flowchart of an exemplary embodiment of the disclosure illustrating a process of alternating between a pre-set exposure time from a first frame to a second frame having an adjusted pre-set exposure time, the frames extending over a desired range $R_D$ of one camera for one cycle in the multi-imaging scanner.

FIG. 5 is flowchart of an exemplary embodiment of the disclosure relating to FIG. 3, illustrating a process 100 of alternating between a pre-set exposure time from a first frame to a second frame having an adjusted pre-set exposure time, the frames extending over a desired range $R_D$ of one or more cameras for one cycle in the multi-imaging scanner. In particular, a process 100 shown for an imaging system 10, alternating between pre-set exposure times from frame-to-frame. At 102, a first frame is set with a pre-set exposure time. At 104, an attempt to read, that is, image and decode a target barcode within the first frame is made. At 106, a determination is made on whether the target barcode was successfully read with the first frame. If the determination at 106 is an affirmative, the process 100 continues by reading the next target barcode at 108 and restarts the process 100 by returning to step 102. If the determination at 106 is negative, an adjustment is made to the pre-set exposure duration associated with a second frame at 110. At 112, an attempt to read the target barcode is made with the second frame.

Figure 6:
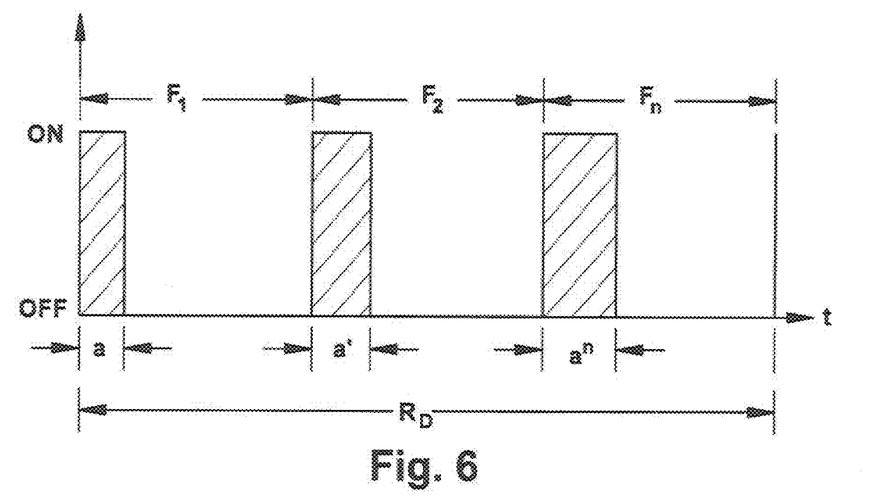
FIG. 6 is a graphical representation of one example embodiment comprising a plurality of frame exposure times over a desired range $R_D$ of one camera for one cycle in the multi-imaging scanner.

Illustrated in FIG. 6 is a graphical representation of another example embodiment comprising a plurality of exposure levels represented by "n" frames exposure times "t" that cover a desired range $R_D$ of one or more cameras 30 for one cycle in the multi-imaging scanner 12. The desired range $R_D$ covers the working area illustrated by the scan field 50 in FIG. 1 or the working area based on variations in window transmission resulting from different glass compositions between scanners 12. The frames, $F_1$, $F_2$, and $F_n$, include differing and selectively adjustable pre-set exposure times represented by areas "a", "a'", and "a''", respectively.

In the example embodiment of FIG. 6, the selectively adjustable pre-set times are increased from "a" to "a'" and to "a'" to "a''", if the respective frame for any of the cameras 30 (C1-C6) is unable to successfully read a target barcode 14. Alternatively, the selectively adjustable pre-set times can, in addition to being increased, decrease to achieve the maximum required exposure time for a frame based on the distance of the target object 16 in the scan field 50, the composition of the glass in the window covering the cameras 30, or a combination thereof. The amount of adjustment in the pre-set exposure time can be obtained from a pre-defined pick list programmed into the imaging systems' 10 software or firmware located in the processor 44 or in a remote processor (not shown) as would be understood by one skilled in the art.

In another example embodiment illustrated in FIG. 6, the areas "a", "a'", and "a''" for each of the cameras 30 represent, not the selectable pre-set exposure duration, but instead represent a selectable pre-set intensity value of the exposure upon the pixel array in the sensor 48. In this exemplary embodiment, an increase in the pre-set intensity that results from a change in the illumination source 34 in combination with a fixed exposure duration increases the depth field for the target object to obtain a successful read by the imaging scanner 12. In yet another example embodiment illustrated in FIG. 6, the areas "a", "a'", and "a''" for each of the cameras 30 represent a combination of both a selectable pre-set exposure durations and selectable pre-set intensity values of the exposure upon the pixel array in the sensors 48. By the illustrated example embodiment having selectable pre-set exposure duration, intensity, or a combination thereof, allows for the advantageous reduction of hardware in conventional scanners such as automatic gain control circuits "AGC".

In yet another example embodiment, not all imaging cameras 30 have more than one exposure time in the imaging system 10 comprising the multi-imaging scanner 12. This could be as a result of the close proximity of the working range (scan field 50 See FIG. 1) to the respective single exposure time camera or cameras. This could also be as a result of the single exposure camera or cameras being located behind a highly transmitting glass window.

The illustrated example embodiments of FIGS. 3 and 6, the frame exposure rates over the desired range $R_D$ are high enough that when a frame is missed because for example, the target object 16 comprising the target barcode 14 is rapidly swiped across the scanner 12, the target barcode is still captured as it passes through the scan field 50 with a subsequent frame in the desired range $R_D$. Frame exposure rates in conventional camera arc approximately 60 frames per second (fps) and, the above example embodiments of FIGS. 3 and 6 will work well with conventional cameras when the target barcode dwells in the scan field 50 to achieve several frame durations. The above example embodiments of FIGS. 3 and 6 will also work well during a rapid swipe of the target barcode 14 through the scan field 50 using a high speed swipe scanner that operates at 1.5 to 2 times 60 (fps).

In another example embodiment, it is possible to change to a pre-set exposure time in accordance with the light transmission efficiency of the scan window, such as the vertical window V or horizontal window H illustrated in FIG. 1. For example, if a DLC window is being used, a pre-set, but selectable exposure time can be set to, for example 400 micro seconds. However, if the window type is change to a sapphire window, the pre-set selectable time is set to approximately 250 micro seconds because of the superior light transmission sapphire window over the properties of the DLC window. If a single exposure time is not sufficient to cover the desired range $R_D$ of the product for each possible type of window, the exemplary embodiment desirably allows the imaging system to alternate exposure times as previously illustrated in FIGS. 3 and 6, but at different levels depending on the window composition in the scanner 12.

Figure 7:
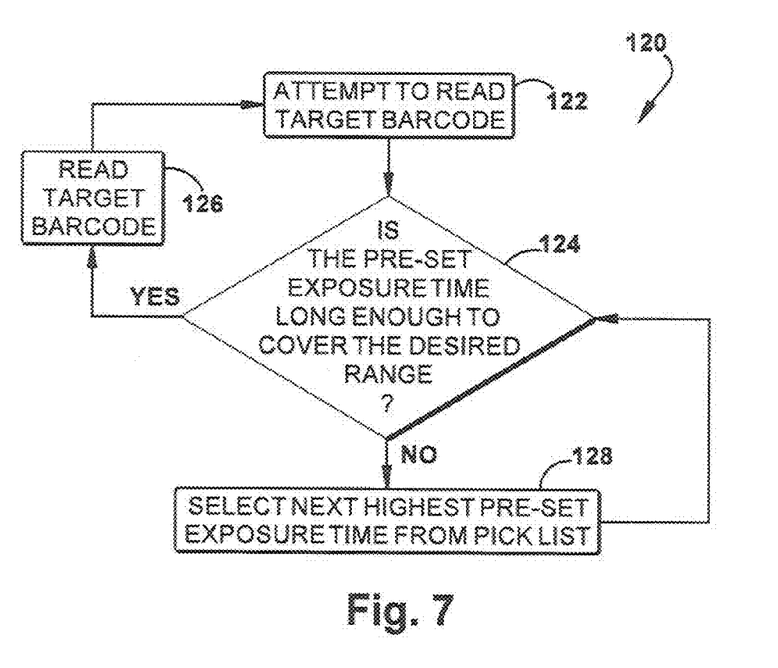
FIG. 7 is flowchart of an exemplary embodiment of the disclosure illustrating a process of alternating and adjusting pre-set exposure times in the multi-imaging scanner.

The selectability of different pre-set exposure times as a function of different glass window compositions or distances to the target object is further illustrated in the example embodiment of FIG. 7. In the illustrated example embodiment of FIG. 7, a process 120 is shown for selecting different pre-set exposure times for one of the plurality of cameras 30, all of which are operating the process 120 independently. At 122, an attempt is made by the multi-imaging scanner 12 to read, that is image and decode a target barcode. At 124, a determination is made as to whether the pre-set exposure time is long enough to cover the desired working range $R_D$. If the determination at 124 is an affirmative, the target barcode is read at 126 and the process 120 is returned to step 122. If the determination at 124 is negative, the next highest pre-set exposure time is selected from a pick list, and the process returns to the determination at 124. The process 120 can occur in a single frame or between frames for one or more cameras 30.

Figure 8:
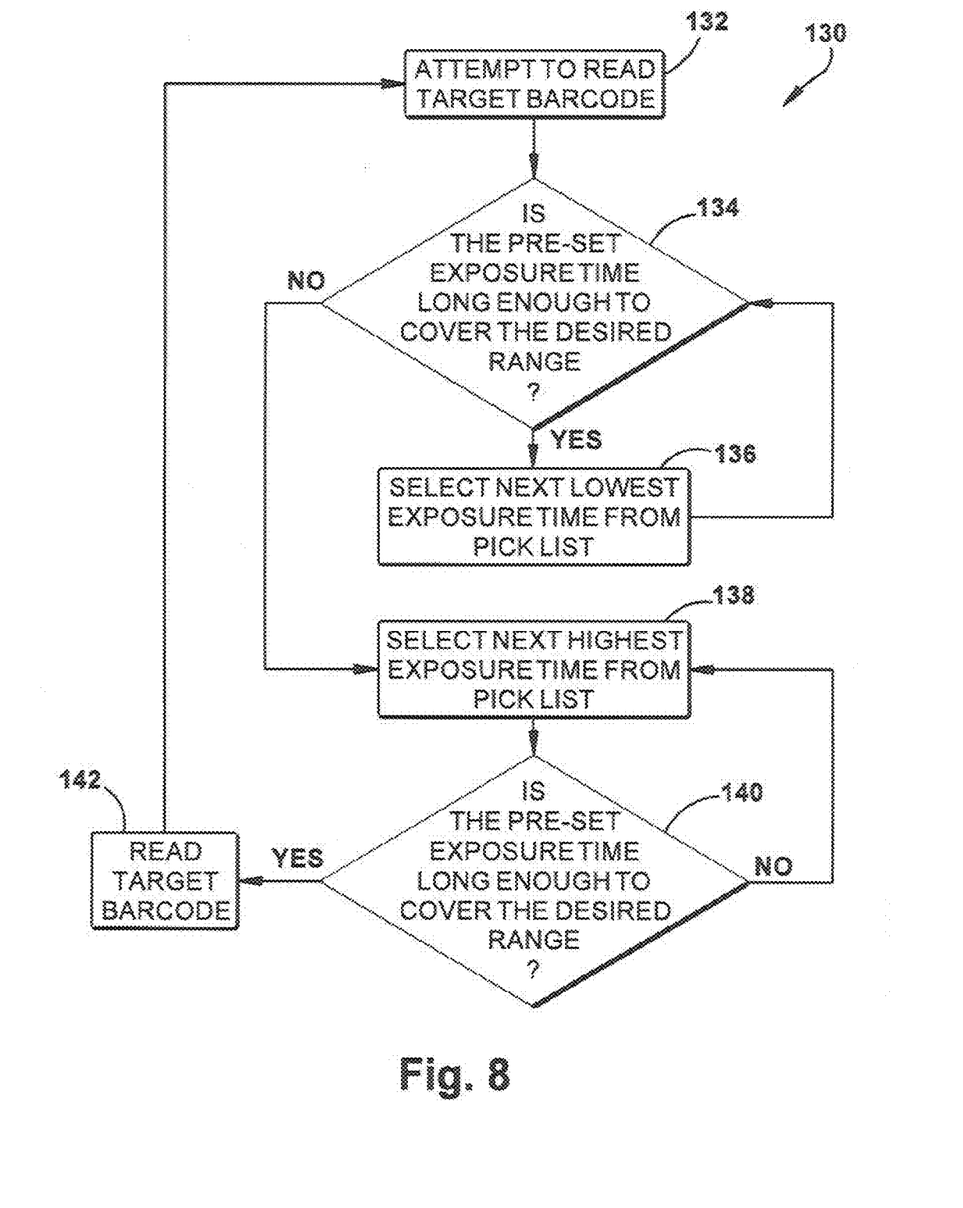
FIG. 8 is flowchart of an exemplary embodiment of the disclosure illustrating a process for selecting optimal pre-set exposure times in the multi-imaging scanner.

The selectability of different pre-set exposure times as a function of different glass window compositions or distances to the target object is further illustrated in another example embodiment in FIG. 8. In the illustrated example embodiment of FIG. 8, a process 130 is shown for selecting optimal pre-set exposure times for one of the plurality of cameras 30, all of which are operating the process 130 independently. At 132, an attempt is made by the scanner 12 to read, that is image and decode a target barcode. At 134, a determination is made as to whether the pre-set exposure time is long enough to cover the desired working range $R_D$. If the determination at 134 is an affirmative, the next lowest exposure time is selected at 136 from a pick list and the process repeats until a negative determination occurs at 134. If the determination at 134 is a negative, the next highest pre-set exposure time is selected at 138 from a pick list, and the process advances to a second determination at 140 where it repeats until an affirmative determination at 140 is made at which time the target barcode with the optimum pre-set exposure time is read at 142. The process 130 can occur in a single frame or between frames for one or more cameras 30.

In the illustrated embodiments of FIGS. 7 and 8, the pick list can be a predefined list written into programmable readable media such as software or firmware coupled to the decoding system 20. Alternatively, the pick list can be a predefined list programmed onto for example, flash Read Only Memory (ROMs) or as a binary image file that can be programmed by a user and embedded into the microprocessor 44, or image processing system 42.

Figure 9:
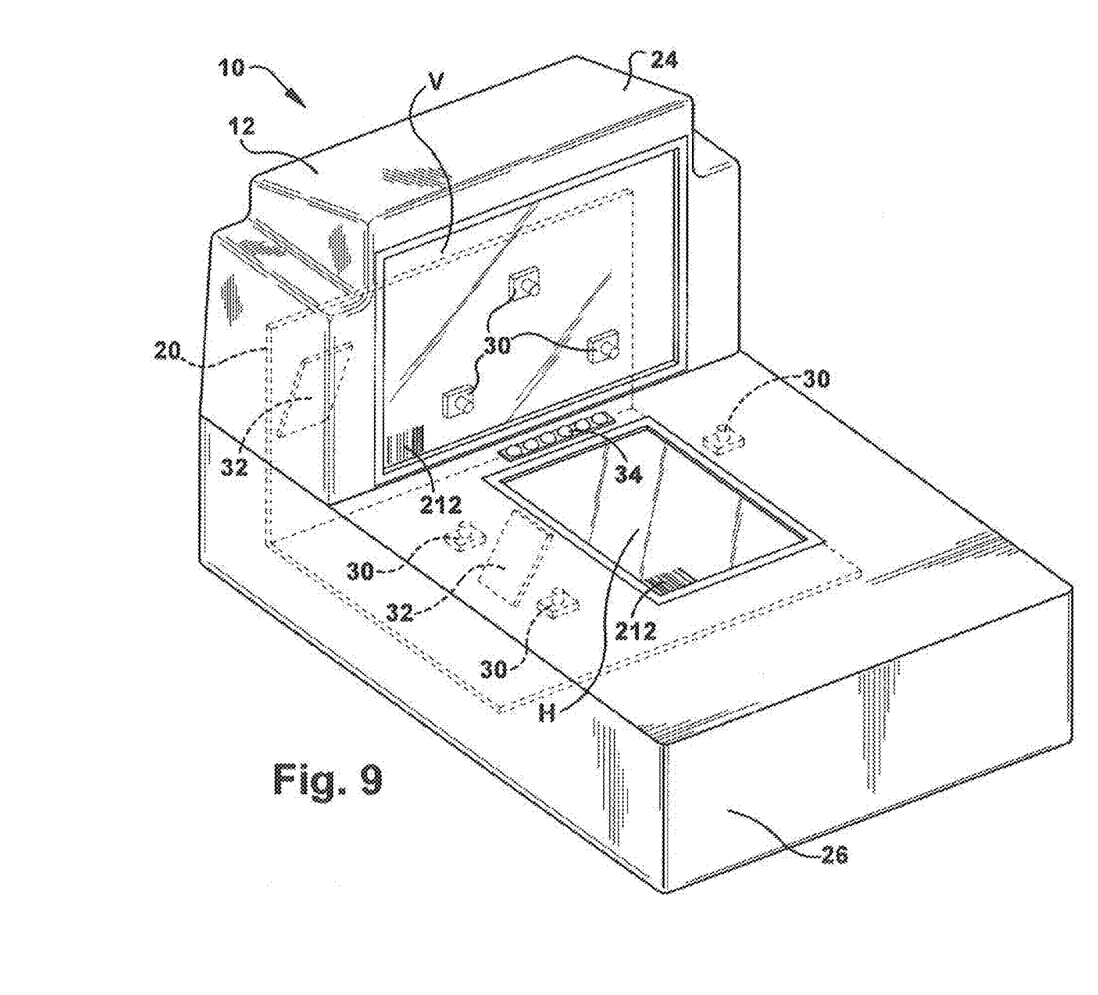
FIG. 9 is a perspective view of a presentation-type multi-imaging scanner constructed in accordance with one embodiment of the present disclosure.

Illustrated in FIG. 9 is one example embodiment illustrating the multi-imaging scanner 12 capable of identifying the type of window installed such that the pre-set, but selectable exposure time for the type of window detected in the scanner 12 is properly chosen. The multi-imaging scanner 12 is constructed such that the vertical V and horizontal H windows include specific indicia 202, such as a barcode, indicating the composition of respective window to which it is attached. In the illustrated embodiment of FIG. 9, the barcode 202 is located on or inside the window, wherein at least one of the cameras 30 can read, that is image and decode the information so that the type of glass for each location is known to the scanner 12 (i.e., the logic and software located for example in the processor 44 or image processing system 42) and the selectable pre-set exposure time is selected accordingly. In yet another example embodiment, the pre-set exposure time is selected such that the scanner 12 operates at a maximum predetermined exposure time for the type of window identified by the process shown in FIG. 9. In another example embodiment, the barcode 202 directly indicates to the imaging system 10 and scanner 12 the maximum exposure time that should be used for the type of window identified by the process shown in FIG. 9.

Figure 10:
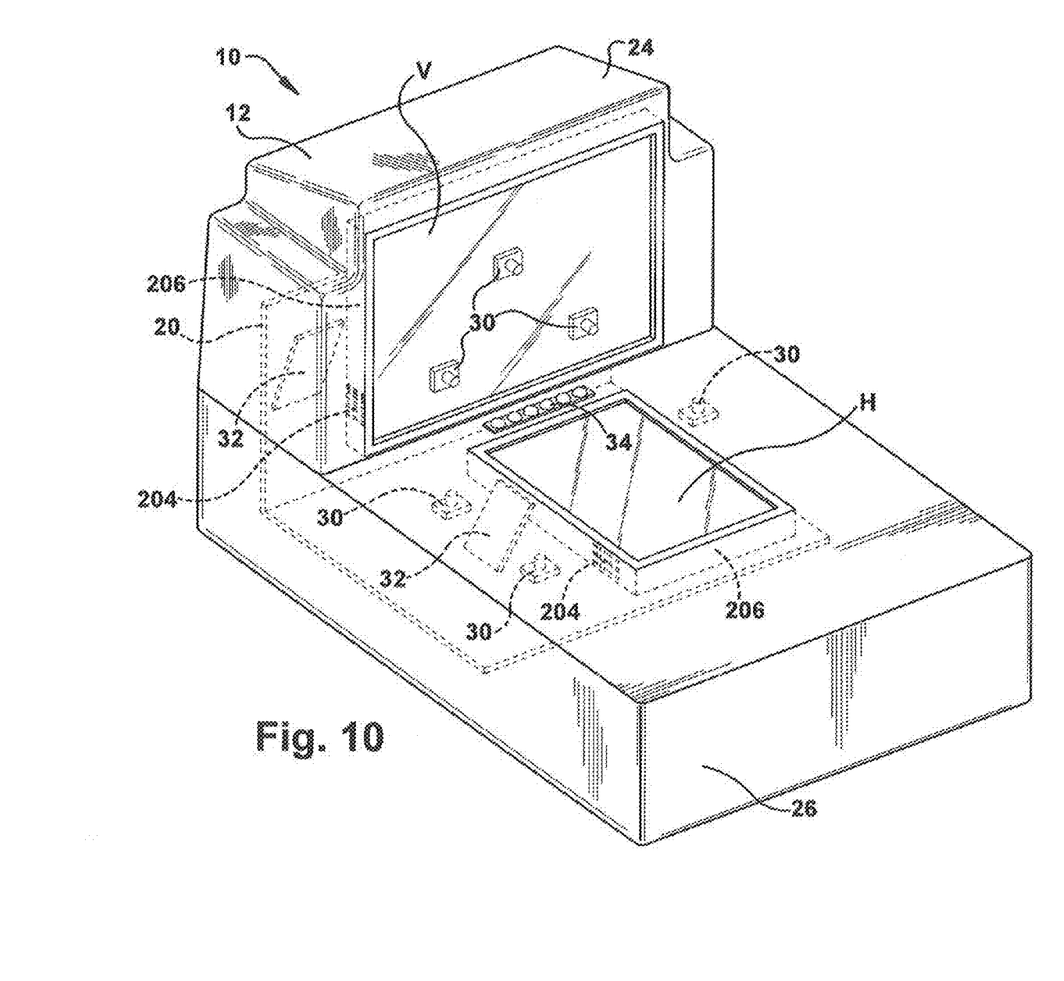
FIG. 10 is a perspective view of a presentation-type multi-imaging scanner constructed in accordance with another embodiment of the present disclosure.

FIG. 10 is an alternative example embodiment illustrating the multi-imaging scanner 12 capable of identifying the type of window installed such that the pre-set, but selectable exposure time for the type of window detected is properly chosen. In particular, the multi-imaging scanner 12 is constructed such that adjacent to the vertical V and horizontal H windows is specific indicia 204, such as a barcode, indicating the composition of respective window to which it is attached. In the illustrated embodiment of FIG. 10, the barcode 204 is located adjacent to the window, such as on each window frame 206, wherein at least one of the cameras 30 can read, that is, image and decode the information so that the type of glass for each location is known to the scanner 12 and the selectable pre-set exposure time is selected accordingly. In yet another example embodiment, the pre-set exposure time is selected such that the scanner 12 operates at a maximum predetermined exposure time for the type of window identified by the process shown in FIG. 10. In another example embodiment, the barcode 204 directly indicates to the imaging system 10 and the scanner 12 the maximum exposure time that should be used for the type of window identified by the process shown in FIG. 10.

Figure 11:
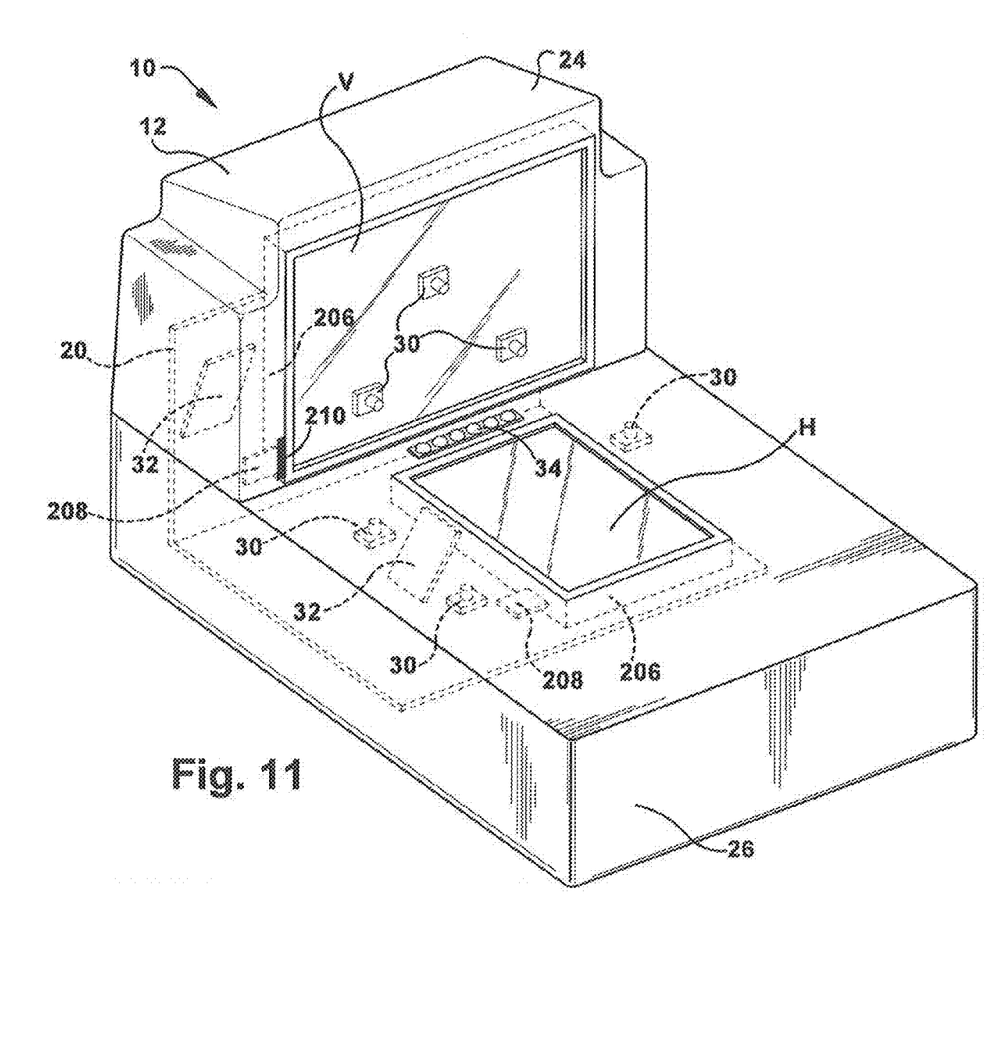
FIG. 11 is a perspective view of a presentation-type multi-imaging scanner constructed in accordance with another embodiment of the present disclosure.

FIG. 11 is an alternative example embodiment illustrating the multi-imaging scanner 12 capable of identifying the type of window installed such that the pre-set, but selectable exposure time for the type of window detected is properly chosen. In particular, the multi-imaging scanner 12 is constructed such that adjacent to the vertical V and horizontal H windows is specific sensor 208, such as a magnetic sensor (e.g., reed switch or hall effect sensor) that detects the presence of a magnet 210 located in the frame 206 of the window. The detection of the magnet 210 acts as an indication of a particular composition of window and the absence of the magnet would indicate yet another composition of window and the pre-set exposure time is selected accordingly. In yet another example embodiment, the pre-set exposure time is selected such that the scanner 12 operates at a maximum predetermined exposure time for the type of window identified by the process shown in FIG. 11. In another example embodiment, the presence of the magnet 210 or its absence directly indicates to the imaging system 10 and scanner 12 the maximum exposure time that should be used for the type of window identified by the process shown in FIG. 11.

Figure 12:
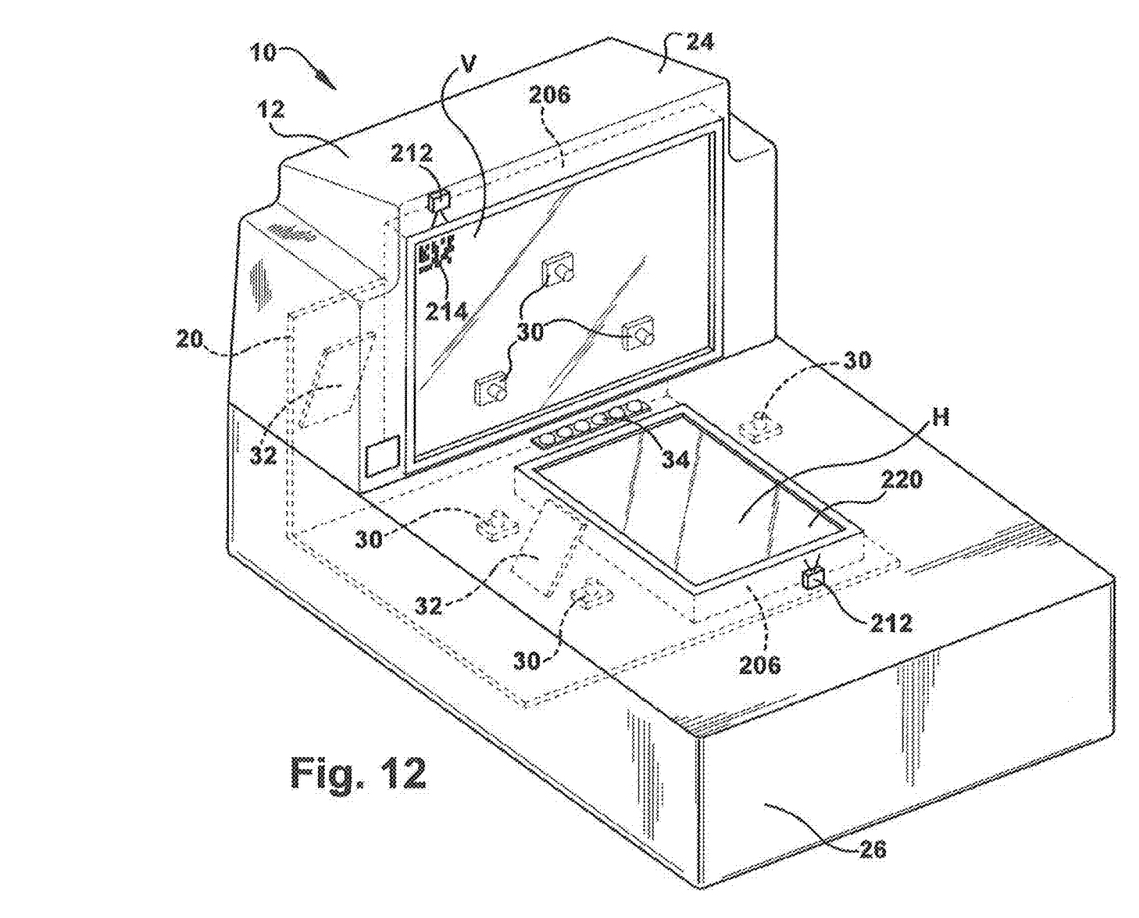
FIG. 12 is a perspective view of a presentation-type multi-imaging scanner constructed in accordance with another embodiment of the present disclosure.

FIG. 12 is an alternative example embodiment illustrating the multi-imaging scanner 12 capable of identifying the type of window installed such that the pre-set, but selectable exposure time for the type of window detected is properly chosen. In particular, the multi-imaging scanner 12 is constructed such that adjacent to the vertical V and horizontal H windows is a specific optical sensor 212 capable of reading, that is imaging and decoding indicia 214 located on the particular window, indicating the composition of respective window to which the indicia is attached. In the illustrated embodiment of FIG. 12, the indicia 214 is located on or inside the window wherein a respective optical sensor 212 can read it, that is image and decode the information so that the type of glass for each location is known to the scanner and the selectable pre-set exposure time is selected accordingly. As shown in the horizontal window H, the absence of indicia 214 in the area 220 near the sensor could also provide an indication to the imaging system 10 the composition of the glass in the window. In yet another example embodiment, the pre-set exposure time is selected such that the scanner 12 operates at a maximum predetermined exposure time for the type of window identified by the process shown in FIG. 12. In another example embodiment, the indicia 214 directly indicates to the imaging system 10 and scanner 12 the maximum exposure time that should be used for the type of window identified by the process shown in FIG. 12.

In yet another example embodiment (not shown), the different windows are used in the multi-imaging scanner 12 that include some indicia that is scanned by the person who installs the window in the scanner. The scanning of the indicia by the installer sets-up the scanner 12 with the appropriate maximum exposure time for that window being installed.

In one example embodiment, the imaging system 10 is programmed within processor 44 or through a remote processor (not shown) to operate using a global shutter mode. Unlike sensors that use rolling shutters, sensors located in the cameras 30 with global shutter modes are able to expose over only a small portion of the frame time, allowing time for the illumination system 34 tied to each camera 30 to flash independently during each camera's respective exposure period without interference. A further detailed discussion relating to global and rolling shutter modes is found in U.S. application Ser. No. 12/333,844 entitled ELECTRONIC SHUTTER FOR A DUAL-MODE IMAGER filed Dec. 12, 2008 and assigned to the assignee of the present disclosure and is incorporated herein by reference in its entirety.

The processor 44 or remote processor (not shown) in the imaging system 10 is coupled to the cameras 30 to control an electronic shutter and exposure time of the pixels located on the sensor arrays within the cameras illustrated in FIGS. 1 and 2. The electronic shutter includes a global shutter mode. The global shutter sensors are then programmed to operate between at least two pre-set exposure times that are anticipated for scanning. For example, the pre-set exposure times would be adequate to decode a target barcode 14 through the maximum required working range $R_D$.

In yet another embodiment, each camera 30 is provided a dedicated illumination system 34 that is only energized when the camera is capturing an image from the target barcode 14. The illumination system 34 is bright enough that the maximum required exposure time is so short that the exposure will always be terminated before the next camera in the plurality of cameras 30 begins to capture an image. As a result, the first imaging camera will not be exposing when the illumination system for the next camera is activated, and the exposure of the first camera will not be affected by the illumination flash of the second camera. The cameras 30 in the exemplary embodiment are exposed in sequence, each ending its exposure before the next is energized. When all cameras 30 have captured images from the target barcode 14, the sequence repeats.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-imaging scanner for imaging indicia located on target objects, the multi-imaging scanner comprising:
   a housing supporting one or more transparent windows and defining an interior region comprising one or more cameras for imaging indicia on target objects as the target objects approach a desired range of the multi-imaging scanner;
   a sensor array associated with each of the one or more cameras for capturing a series of frames within a respective field of view of each of said one or more cameras; and
   a processor coupled to said one or more cameras for imaging and decoding the indicia on said target objects captured in said frames by said one or more cameras, said frames comprising a first frame having a first pre-set exposure time and a second frame having a second pre-set exposure time such that first and second pre-set exposure times are of different duration,
   wherein at least one of the first pre-set exposure time and the second pre-set exposure time is based on a light transmission efficiency of the one or more transparent windows; and
   wherein said one or more transparent windows comprise an indication source as to the composition of the glass forming the window such that said processor evaluates said indication source to selectively elect said first or second pre-set exposure time from a pick list.

2. The multi-imaging scanner of claim 1 wherein said first and second pre-set exposure times are selectably elected by said processor.

3. The multi-imaging scanner of claim 1 wherein said first pre-set exposure time is less than said second pre-set exposure time.

4. The multi-imaging scanner of claim 1 wherein said processor evaluates said imaging and decoding of the indicia captured in said first frame and if said indicia are not readable, said processor selectively elects said second pre-set exposure time from a pick list.

5. The multi-imaging scanner of claim 4 wherein said processor evaluates said imaging and decoding of the indicia captured in said first frame and if said indicia is not readable, said processor selectively elects said second pre-set exposure time from a pick list having an exposure duration time greater than said first pre-set exposure time.

6. The multi-imaging scanner of claim 1 wherein said indication source is a barcode located on said one or more transparent windows.

7. The multi-imaging scanner of claim 1 wherein said indication source is a magnet located in said window detected by a magnetic sensor located in said housing.

8. The multi-imaging scanner of claim 7 wherein said magnetic sensor is a hall effect sensor.

9. The multi-imaging scanner of claim 1 wherein said indication source is an optically readable object that read by an optical sensor.

10. The multi-imaging scanner of claim 1 wherein said indication source is read by said one or more cameras.

11. A method of operating a multi-imaging scanner for imaging indicia located on target objects, the method comprising:
   supporting one or more transparent windows in a housing that defines an interior region;
   imaging indicia located on target objects with one or more cameras as the target objects approach a desired range of the multi-imaging scanner;
   capturing a series of frames within a respective field of view of each of said one or more cameras with a sensor array associated with each of the one or more cameras;
   coupling a processor to said one or more cameras for imaging and decoding the indicia on said target objects captured in said frames by said one or more cameras; and
   allocating a first frame in said frames with a first pre-set exposure time and a second frame with a second pre-set exposure time such that first and second pre-set exposure times are of different duration,
   wherein at least one of the first pre-set exposure time and the second pre-set exposure time is based on a light transmission efficiency of the one or more transparent windows; and
   wherein said one or more transparent windows comprise an indication source as to the composition of the glass forming the window such that said processor evaluates said indication source to selectively elect said first or second pre-set exposure time from a pick list.

12. The method of claim 11 further comprising programming said processor to selectively elect said first and second pre-set exposure times.

13. The method of claim 11 further comprising evaluating with said processor the imaging and decoding of the indicia captured in said first frame and if said indicia is not readable, using said processor to selectively elect said second pre-set exposure time from a pick list.

14. The method of claim 11 further comprising evaluating with said processor the imaging and decoding of the indicia captured in said first frame and if said indicia is not readable, increasing the pre-set exposure time in said second frame to a value greater than the pre-set exposure time in said first frame.

15. A multi-imaging system for imaging indicia located on target objects, the multi-imaging system comprising:
   a scanner having a housing supporting one or more transparent windows and defining an interior region comprising one or more cameras for imaging indicia on target objects as the target objects approach a desired range of the multi-imaging scanner;
   a sensor array associated with each of the one or more cameras for capturing a series of frames within a respective field of view of each of said one or more cameras;
   a processor coupled to said one or more cameras for imaging and decoding the indicia on said target objects captured in said frames by said one or more cameras; and
   a pick list programmed into said multi-imaging system having a plurality of pre-set exposure levels to be selectively elected by said processor for said frames for said one or more cameras each having a first frame with a first pre-set exposure level and one or more subsequent frames having a subsequent pre-set exposure level wherein said subsequent exposure level is selected from said plurality of pre-set exposure levels,
   wherein at least one of the first pre-set exposure level and the subsequent pre-set exposure level is based on a light transmission efficiency of the one or more transparent windows; and
   wherein said one or more transparent windows comprise an indication source as to the composition of the glass forming the window such that said processor evaluates said indication source to selectively elect said first or second pre-set exposure time from a pick list.

16. The multi-imaging system of claim 15 wherein said subsequent exposure level is selected from the plurality of pre-set exposure levels when said first frame having the pre-set exposure level is unsuccessful in reading the target object.

17. The multi-imaging system of claim 15 wherein said level or levels in said plurality of pre-set exposure levels, first pre-set exposure level, and subsequent pre-set exposure level are associated with the time that the sensor array is exposed for said one or more cameras.

18. The multi-imaging system of claim 15 wherein said level or levels in said plurality of pre-set exposure levels, first pre-set exposure level, and subsequent pre-set exposure level are associated with the intensity of the exposure on sensor array for said one or more cameras.

19. The multi-imaging system of claim 15 wherein said first pre-set exposure level and subsequent exposure level for each of said one or more cameras is selected from the plurality of pre-set exposure levels such that the multi-imaging system operates at a maximum predetermined exposure level.

* * * * *

UNITED STATES PATENT AND TRADEMARK OFFICE
CERTIFICATE OF CORRECTION

| | | |
|---|---|---|
| PATENT NO. | : 8,146,822 B2 | Page 1 of 1 |
| APPLICATION NO. | : 12/416997 | |
| DATED | : April 3, 2012 | |
| INVENTOR(S) | : Drzymala et al. | |

It is certified that error appears in the above-identified patent and that said Letters Patent is hereby corrected as shown below:

In Column 1, Line 21, delete "arc" and insert -- are --, therefor.

In Column 3, Line 16, delete "FIG. 1," and insert -- FIG. 1 --, therefor.

In Column 3, Line 22, delete "a" and insert -- is a --, therefor.

In Column 3, Line 33, delete "is" and insert -- is a --, therefor.

In Column 3, Line 43, delete "is" and insert -- is a --, therefor.

In Column 3, Line 46, delete "is" and insert -- is a --, therefor.

In Column 5, Line 52, delete "arc" and insert -- are --, therefor.

In Column 8, Line 9, delete "computer;" and insert -- computer, --, therefor.

In Column 11, Line 18, delete "arc" and insert -- are --, therefor.

Signed and Sealed this
First Day of January, 2013

David J. Kappos
*Director of the United States Patent and Trademark Office*